(12) United States Patent
Murray et al.

(10) Patent No.: US 6,257,957 B1
(45) Date of Patent: Jul. 10, 2001

(54) TACTILE FEEDBACK SYSTEM

(75) Inventors: Jeffrey Murray, Ellington; Michael Goulet, Hebron; Jonathan Dooley, Bolton, all of CT (US); Paul Estabrooks, Monson, MA (US); Ken Davidson, Tolland, CT (US)

(73) Assignee: Gerber Coburn Optical Inc., South Windsor, CT (US)

( * ) Notice: Subject to any disclaimer, the term of this patent is extended or adjusted under 35 U.S.C. 154(b) by 0 days.

(21) Appl. No.: 09/452,586

(22) Filed: Dec. 1, 1999

(51) Int. Cl.[7] .................................................. B24B 13/02
(52) U.S. Cl. .................. 451/9; 451/10; 451/42; 451/390; 451/405; 451/387; 74/490.8
(58) Field of Search .................... 451/10, 9, 14, 451/42, 390, 392, 405, 387; 74/490.06, 813 R, 813 L; 901/29; 287/154, 160

(56) References Cited

U.S. PATENT DOCUMENTS

| | | |
|---|---|---|
| 3,093,939 | 6/1963 | Dalton . |
| 3,194,990 | 7/1965 | Kendall . |
| 3,921,340 | 11/1975 | Johnson et al. . |
| 4,307,617 | 12/1981 | Greet et al. . |
| 4,648,210 | 3/1987 | Reinmold et al. . |
| 4,771,578 | 9/1988 | Jorgensen et al. . |
| 4,827,240 | 5/1989 | Hafner . |
| 4,853,630 | 8/1989 | Houston . |
| 4,884,941 | 12/1989 | Kazerooni . |
| 4,936,148 | 6/1990 | Shaw et al. . |
| 5,053,687 | * 10/1991 | Merlet ................................ 74/490.06 |
| 5,054,244 | 10/1991 | Takamatsu et al. . |
| 5,076,026 | 12/1991 | Mizuguchi et al. . |
| 5,157,871 | 10/1992 | Gawa et al. . |
| 5,185,957 | 2/1993 | Mizuguchi et al. . |
| 5,333,514 | * 8/1994 | Toyama et al. ........................ 74/479 |
| 5,378,282 | * 1/1995 | Pollard ................................ 118/697 |
| 5,558,557 | 9/1996 | Dashevsky . |
| 5,573,443 | 11/1996 | Yasuda et al. . |
| 5,711,196 | * 1/1998 | Reid et al. ............................ 82/1.11 |
| 5,740,699 | * 4/1998 | Ballantyne et al. .............. 74/490.06 |
| 5,882,243 | 3/1999 | Das et al. . |
| 5,941,128 | * 8/1999 | Toyama et al. ................... 74/490.06 |
| 5,980,360 | * 11/1999 | Murray et al. ............................ 451/5 |
| 6,146,044 | * 11/2000 | Calvet ................................. 403/119 |

* cited by examiner

Primary Examiner—Joseph J. Hail, III
Assistant Examiner—George Nguyen
(74) Attorney, Agent, or Firm—Cantor Colburn LLP

(57) ABSTRACT

A system for enhancing lens preparation which allows for error compensation to provide nearly error-free lens fining and/or polishing. The system employs a flexure to allow three degrees of freedom for a lens being prepared. The system also employs a Hall effect circuit board to monitor movement of the flexure to account for error, provide feedback to a controller so that compensation for such error can be effected and so that proper force may be maintained. The flexure and the sensor feedback subsystem enable nearly error-free lens surfaces.

30 Claims, 5 Drawing Sheets

TACTILE FEEDBACK SYSTEM

BACKGROUND OF THE INVENTION

1. Field of the Invention

The invention relates to the field of three dimensional surface finishing. More particularly, the invention relates to a flexure and a position monitoring subsystem of a lens preparation system.

2. Prior Art

Ophthalmic and other types of lenses are typically produced from lens blanks of glass or plastic having two major surfaces, one of which is typically finished, and the other of which is unfinished. Cutting, fining and polishing, operations are performed on the unfinished surface of the lens blank by a machine responsive to data corresponding to a particular lens prescription. The cutting operations are usually accomplished by employing a ball mill for plastic lenses, or a grinder for glass lenses. These cutting operations generally create a lens surface closely approximating the shape of the finished lens. However, the cut surface of the lens blank is often rough and requires that subsequent fining and polishing operations be performed on the lens blank to achieve the requisite optical clarity.

The fining and polishing operations are ordinarily performed by engaging the cut surface of the lens blank with a tool having a shape that closely approximates the desired finished shape of the lens as defined by the lens prescription. This abrasive surface is referred to by those skilled in the pertinent art as a tool or "lap". During operation, the lens blank moves relative to the abrasive surface of the lap along a conforming contoured semi-spherical path, thereby fining and/or polishing the lens surface. Laps consist of a mandrel, to which a removable abrasive pad is applied. The lens blank is moved relative to the lap during fining and polishing operations. The combined shape of the mandrel and the pad must conform as closely as possible to the prescribed shape of the lens, therefore, different lens prescriptions require different laps to be used.

Prior lens fining and polishing machines have used mechanical oscillating machines to move the lap relative to the lens blank. The oscillating motions have been fixed, defined by the mechanical structure of the fining and polishing machine, with differences between the ideal motion for sliding the lap against the lens blank taken up by a biasing mechanism which provides the force between the lap and lens blank and by leaving either the lap or lens blank free to pivot about at least one axis in response to the motion of the fining and polishing machine.

SUMMARY OF THE INVENTION

The above-identified drawbacks of the prior art are overcome or alleviated by the tactile feedback system of the invention.

The tactile feedback system of the invention comprises a flexure having three degrees of freedom and a deflection-sensing subsystem. The subsystem comprises a plurality of movement-sensing arrangements such as a plurality of magnets mounted on a chuck and a Hall effect circuit board in operable communication with said plurality of magnets. The tactile feedback system is configured to supplement an apparatus which is the subject of U.S. patent application Ser. No. 09/073,491 filed May 6, 1998 entitled METHOD AND APPARATUS FOR PERFORMING WORK OPERATIONS ON A SURFACE OF ONE OR MORE LENSES, assigned to the assignee hereof and fully incorporated herein by reference. The flexure portion of the feedback system comprises a configuration which provides predictable stiffness, allows only three degrees of freedom, and exhibits an extended service life. The deflection-sensing subsystem collects information about the deflection of the flexure by measuring magnetic field movement and transmits the information back to a controller to process which allows the controller to maintain a uniform distribution of force at a desired magnitude on the lens surface throughout the programmed movement. It is also important to note that the tactile feedback allows the machine itself to compensate for misalignments in its structure because the structure does not dictate the working parameters but merely supports the various components of the machine.

BRIEF DESCRIPTION OF THE DRAWINGS

Referring now to the drawings wherein like elements are numbered alike in the several Figures.

DETAILED DESCRIPTION OF THE INVENTION

Figure 1:
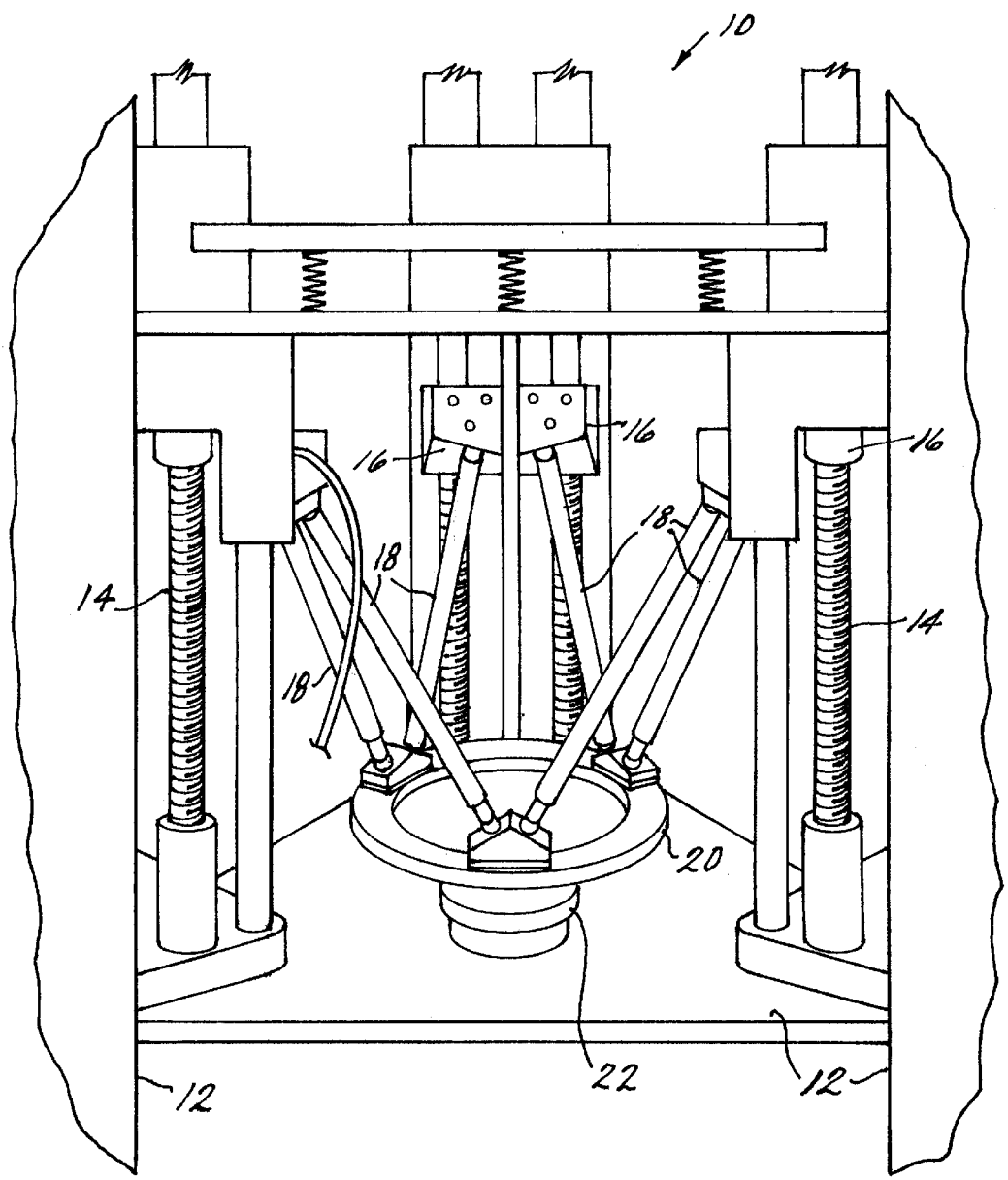
FIG. 1 is a schematic perspective view of the lens machine with which the tactile feedback system of the invention is employed.

In the following discussion and in the drawing figures referenced herein, a lens-making machine is directly disclosed. It is important to note, however, that the tactile feedback system of the invention is not limited to lens-making machines but rather may be employed for any type of machining where a tactile feedback loop is desirable. The invention provides multiple degrees of freedom and the ability to control forces in all of the degrees of freedom available to it. It should also be pointed out that the portion of the invention controlled by the Controller as described herein may be employed to support and move the lens (work piece) or the lap (work tool) as desired.

Referring to FIG. 1, the lens machine 10 with which the invention is to be employed is illustrated schematically. Frame 12 is the basis of the lens machine 10 and provides structural support for all elements thereof. Within frame 12 are mounted six lead screws 14 of which four are visible in the figure. The lead screws 14 are powered rotationally in a clockwise or counterclockwise direction by individual motors 60 depending upon the operation performed and the direction of the controller (not shown). Each lead screw 14 is attached to a follower 16 which is connected to an individual articulated arm 18. Arms 18 are connected at their respective other ends in an articulated manner to a moving platform 20. (Moving platform 20 was referred to as a "mounting bracket" in the prior application which this application incorporates by reference. The identifier "moving platform" has been adopted in this application since it is deemed to be more descriptive). A lens chuck and lens (not shown) would be mounted to the moving platform 20 in a location central to moving platform 20 and on a flexure (not shown) and moved by selective movement of the lead screws 14. Beneath the moving platform 20 is a lap 22 which will retain an abrasive pad (not shown). The lens is prepared by being abraded against the lap 22 in a controlled manner and motion described in the hereinbefore identified patent application. The device, as disclosed in the prior application identified above, provides preferably six degrees of freedom which is advantageous in lens making. It is important to note however that a five degree of freedom assembly is also useable to produce lenses. Such a machine would remove the capability of rotation about the z-axis.

Figure 2:
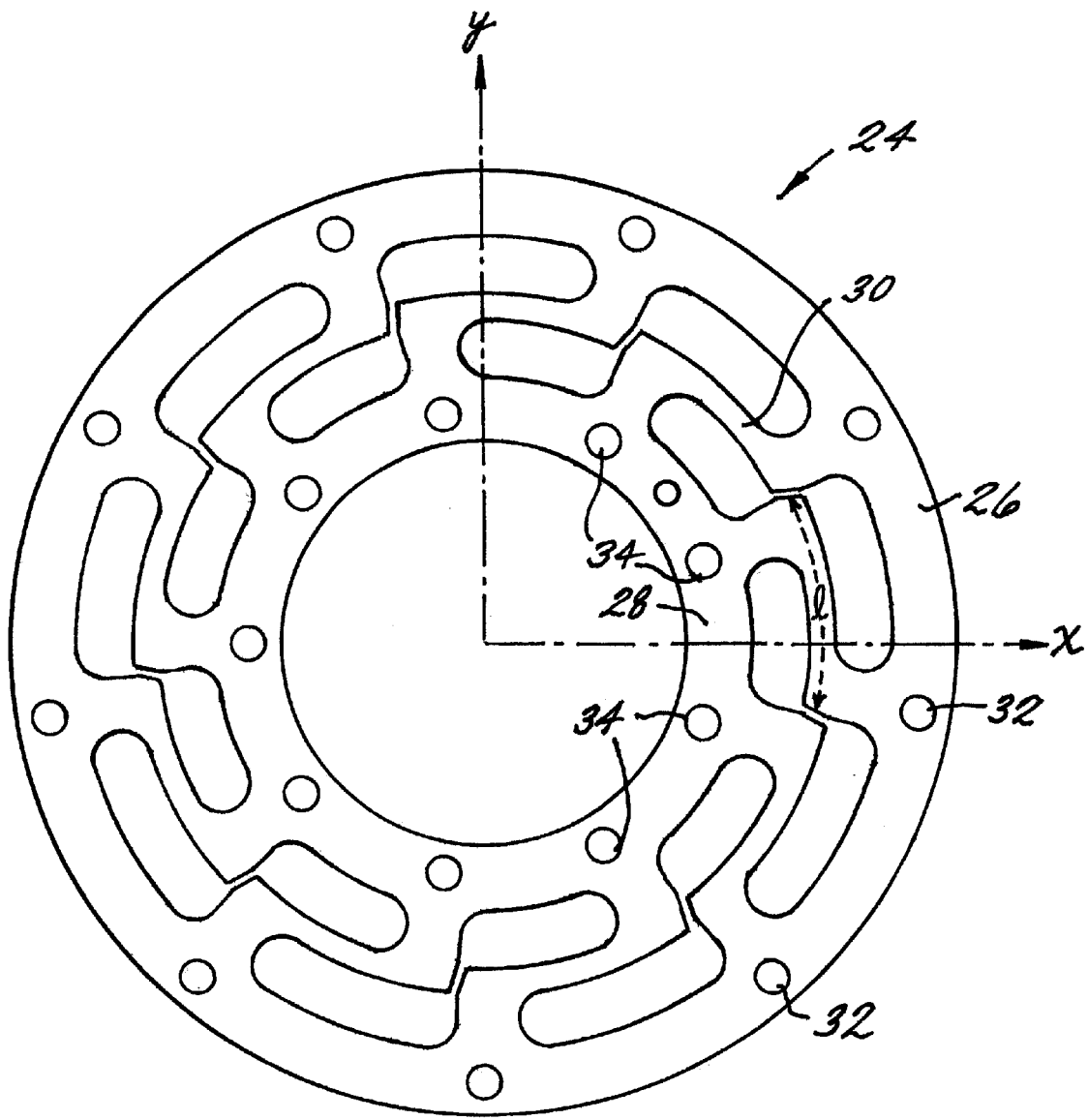
FIG. 2 is a plan view of a flexure of the invention.

Referring to FIG. 2, a flexure 24 of the invention is illustrated. The flexure is preferably constructed of phosphor bronze which is commercially available from McMaster-Carr and is commercially known as alloy 510/spring temper grade A material. A preferred thickness of the material is dictated by the range of forces desired to be employed. In the preferred embodiment described herein the material is in the range of 0.015 to 0.050 with a preferred thickness of 0.032. Exterior planar dimensions of flexure 24 are dictated by lens machine 10 and may be of any geometric shape and size. In a preferred embodiment, flexure 24 is circular and is of a diameter of about 5.5 inches. Preferably the diameter will closely approximate that of the moving platform 20 to which it will be attached.

Flexure 24 defines an outer ring 26 which is joined to an inner ring 28 (which is sized to accept a lens chuck (not shown) by a series of dog leg members 30, each of which is the result of the removal of material from a raw solid disk. In a preferred embodiment, nine dog leg members 30 are created by removal of material from flexure 24 in the pattern illustrated in FIG. 2. Several fastener holes 32 and 34 are provided for attaching flexure 24 to other components as will be appreciated from the following description.

Due to the configuration of flexure 24, three degrees of freedom are allowed. More specifically, inner ring 28 may be displaced to a plane parallel with the plane of outer ring 26. Inner ring 28 may also be displaced relative to outer ring 26 at an angle. Perusal of FIG. 2 reveals an x and y axis drawn thereon for reference. The angular movement freedom of ring 28 is referred to as α and β, α being rotation about the x-axis and , being rotation about the y-axis. α and β movements are limited to a maximum of about ±3° total and the stop ring limits movement to about ±2° but it is important to note that software employed with the tactile feedback system of the invention preferably limits movement to about ±0.1°. It will of course be M appreciated that any combination of the movements stated is possible thus, three degrees of freedom. The maximum linear deflection of inner ring 28 is preferably in the range of 0–0.125 inch in a direction normal to x-y plane, (z) direction.

Since it is desirable in the art that flexure 24 be capable of enduring a great many cycles, it is advantageous to break all edges of the material and polish the same. The procedure removes small surface imperfections that might otherwise lead to failure of the flexure. It has been determined that the breaking and polishing procedure allow a single flexure to have a service life equaling that of the lens machine 10.

Flexure 24, by providing the freedom of movement discussed hereinabove, helps to maintain even pressure on a lens blank mounted in the machine 10 for abrasion during the lens preparing operation. By maintaining even pressure, the likelihood that an imperfection such as a flat spot in the lens or unwanted prism would be introduced in the lens is reduced. This is desirable both to the manufacture and to the public. Fewer "defective" lenses and better vision, respectively, is achieved.

To render the lens machine 10 even more capable of producing near-error-free lenses, a deflection-sensing subsystem is added to the flexure 24. The deflection-sensing subsystem measures the amount of deflection of flexure 24 at preferably three points equally spaced at about 120° apart on the circular embodiment illustrated. By measuring such deflection and feeding such information to the controller (not shown) of lens machine 10, the significant benefits of the invention are realized. More specifically, the tactile feedback system of the invention allows for the maintenance of uniform force of a desired magnitude over the entirety of the workpiece surface whether that surface be a lens or any other product By maintaining uniform force of a desired magnitude over the surface of the workpiece, material removed will be consistent over the entire surface. In the lens-making art, such consistency avoids unwanted prism in the final lens produced by a lens machine employing the tactile feedback system of the invention. While it is a superior benefit to have sufficient control to maintain uniform force of a desired magnitude on the work product, it is also possible, if desired, to intentionally prevent uniformity of force. The controller of the invention is capable of changing forces on certain areas only and therefore building in a wanted prism (lens art) or other nonuniformity of surface structure. The nonuniformity may be a raised portion or a lowered portion of the material of the workpiece depending upon interest and appropriate programming. Another significant benefit of the system of the invention is that it is not dependent upon proper construction of support members of a housing of the device. More particularly, even if the device is assembled incorrectly (missing spacer, uneven frame, etc.) the workpiece is not affected. Adjustments are made by the controller to maintain its uniform or programmed nonuniform pressure and will do so regardless of any misalignment of the frame 12 of the machine.

The deflection-sensing subsystem may employ many different kinds of sensors including Eddy current sensors, capacitor sensors (these must be in a protected environment), LVDTs, strain gauges, linear encoders, etc. In the following discussion, however, Hall effect sensors are employed.

Figure 3:
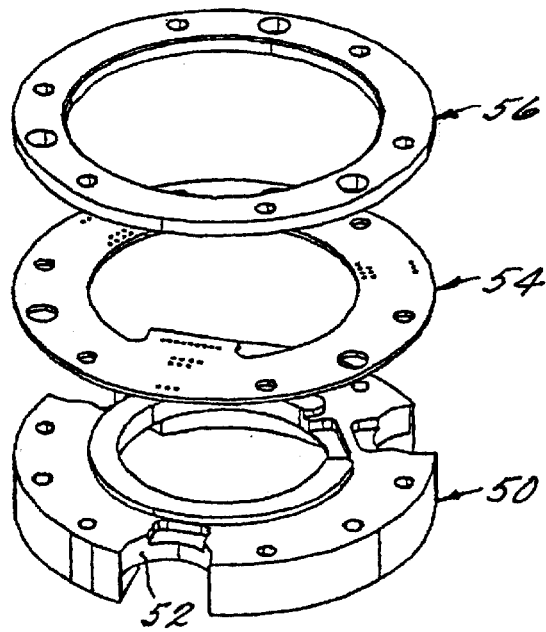
FIG. 3 is a perspective exploded view of a portion of the lens machine and the components of the tactile feedback system.
Figure 3:
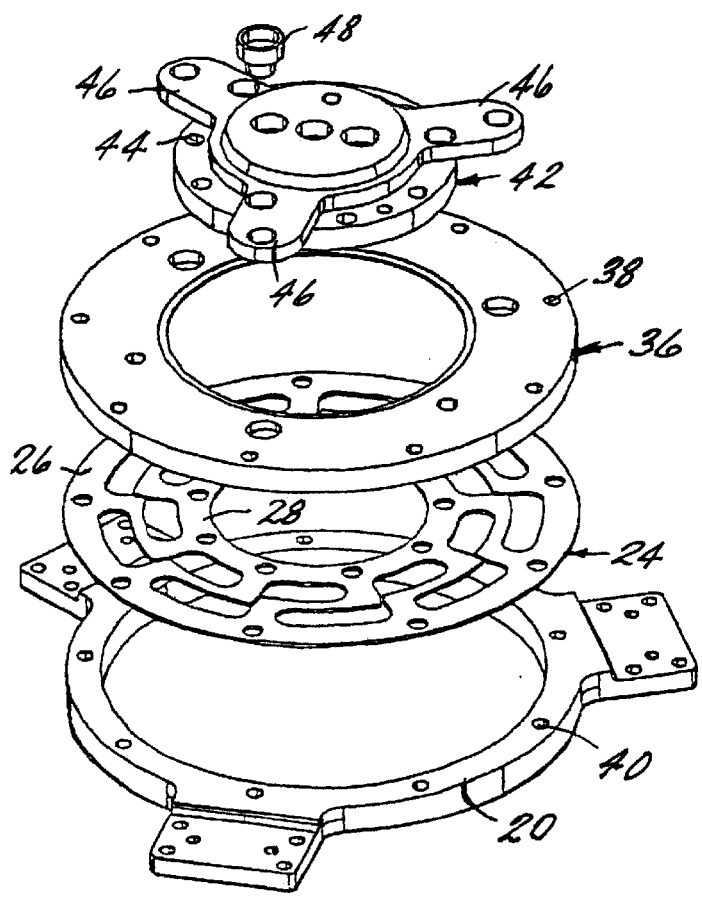
Figure 4:
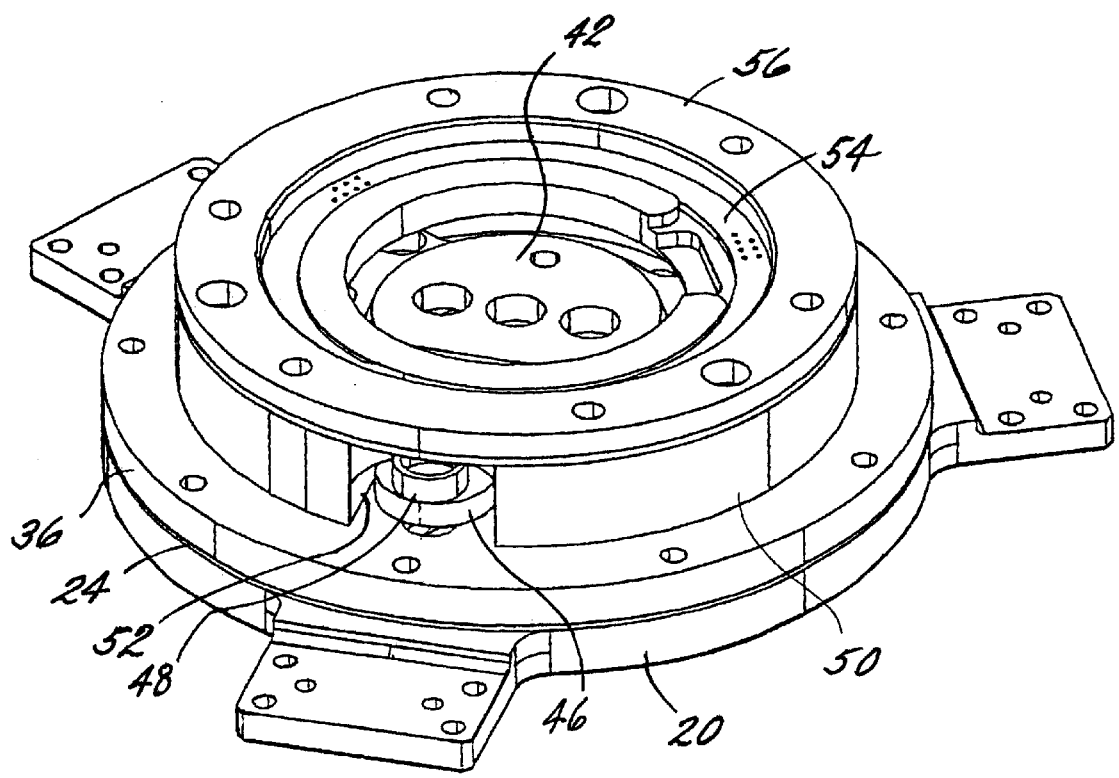
FIG. 4 is a perspective view of the tactile feedback system of the invention.

Referring to FIGS. 3 and 4, the exploded view will provide understanding of the invention while FIG. 4 shows the assembled invention. Beginning from the lowest level on drawing FIG. 3, moving platform 20 is illustrated. It will be recalled that moving platform 20 is a driven member in lens machine 10. Immediately upwardly adjacent moving platform 20 is flexure 24 which will be fixedly attached to moving platform 20 thorough a clamp 36 using holes 32 of flexure 24 and aligning holes 38 and 40 in clamp 36 and moving platform 20, respectively. To inner ring 28 is fastened chuck body 42 through holes 44 to holes 34 of flexure 24. Chuck body 42, it will be appreciated, is moveable relative to clamp 36 due to deflection of flexure 24.

Chuck body 42 includes magnet arms 46 to receive and position magnet studs 48. Preferably three magnet studs 48 are provided, each being endowed with a permanent magnet (not shown). Because of the movement of chuck body 42, magnet studs 48 will change position to a small degree. This movement is sensed by components discussed hereunder. In an alternate configuration, magnets are mounted directly on magnet arms 46 deleting the studs 48. This configuration is not shown but is clear to one of ordinary skill in the art.

Above chuck body 42 is stop ring 50 which is fixedly attached to clamp 36. Stop ring 50 provides for movement in chuck body 42 by leaving space thereunder (not shown) to the extent movement is desired in chuck body 42. Movement thereof is also limited by stop ring 50. Visible at the outside diameter of stop ring 50 are scallops 52 which allow space for magnet studs 48 and their associated magnets (not shown). The space allows movement but also, and importantly, facilitates an unimpeded path for the magnetic field of each magnet to reach a Hall effect circuit board 54 which is attached to an upper surface of stop ring 50. The Hall effect circuit board employs the moving magnetic fields of the magnets mounted on the chuck body 42 along a stationary field of a ring 56 having three preferably Samarium cobalt magnets mounted therein and aligned with magnet stubs 48 mounted atop thereof to determine the degree of deflection of flexure 24 during operation of lens machine 10. The deflection is measured at the three locations occupied by magnet arms 46 and studs 48 with their magnets (not shown) by sensing a change in the magnetic field interaction between the moveable magnets and the stationary ring 56. It is also desirable to include a dampener material (not shown) near each moveable magnet. Preferably the dampener material is about ¼ inch in diameter and about ½ inch long-Isodam® (trademark of E•A•R specialty composites) vinyl urethane material.

The Hall effect circuit board 54 is communicatively attached to a controller (not shown) of lens machine 10 and allows for processing within said controller so that adjustments may be made (approximately 2000 times per second) to maintain uniformity of force of a desired magnitude or the specific programmed nonuniformity. The tactile feedback system of the invention allows lens machine 10 to make a nearly perfect lens for each run of the machine. The same is true for any type of machining where measured force and a feedback loop are applicable.

Figure 5:
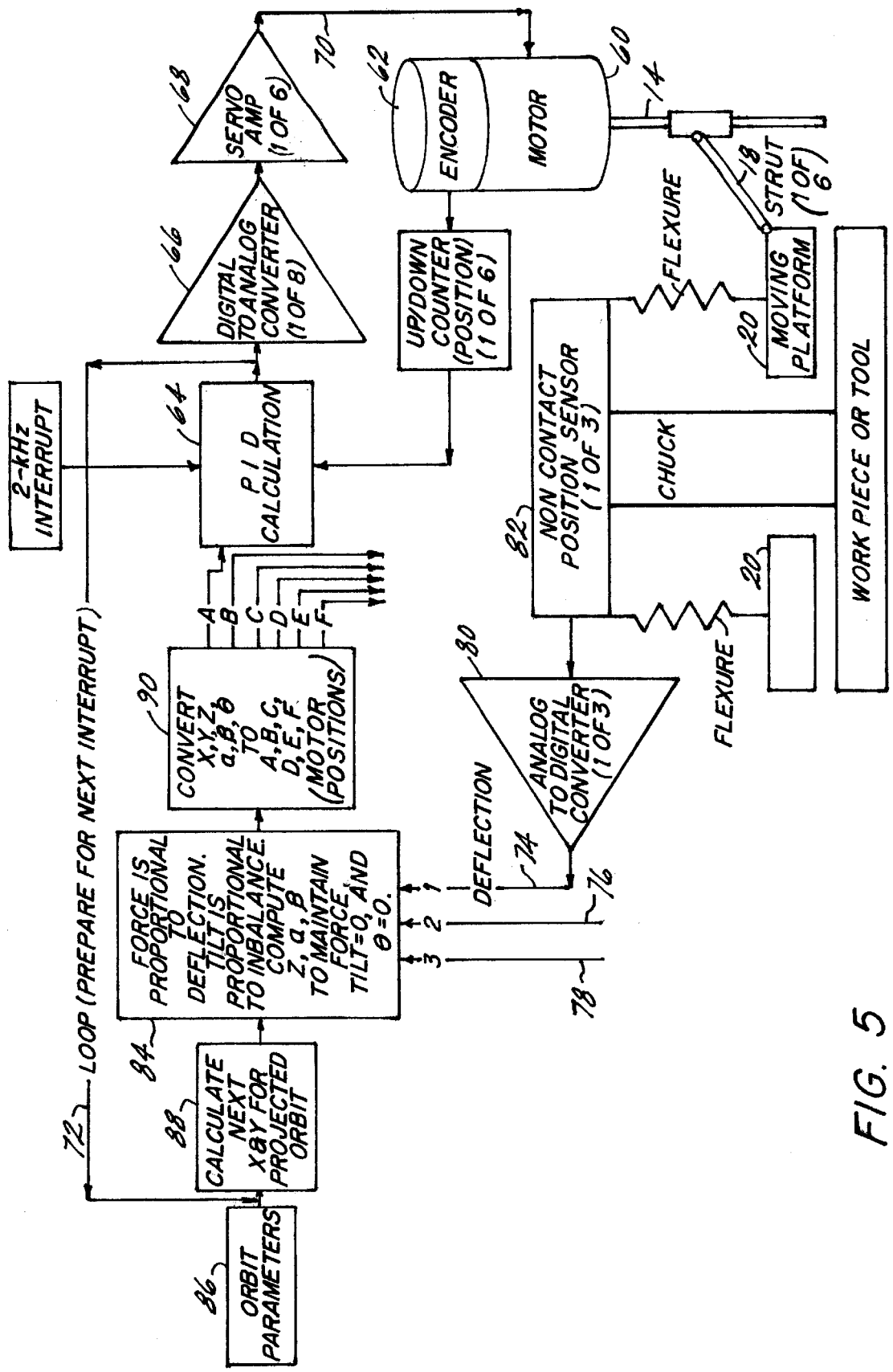
FIG. 5 is a control diagram depicting the operation of the invention.

Referring to FIG. 5, a control diagram is provided which will provide one of ordinary skill in the art with an enhanced understanding of the control operation of the invention. The control diagram comprises several information loops which together derive the benefits of the invention. Moving platform 20 is schematically shown at the right lower portion of the control diagram. Moving platform 20 is shown to be attached via articulated arm 18 to a lead screw 14 which is driven by a motor 60 (six of these arms and motors are preferred). Motor 60 is connected to an encoder 62 which measures motor movements to provide definitive position information regarding motor 60. Encoder 62 provides digital information to PID calculation module 64 which then determines desired movement of motor 60 based first upon an overage of the sensors and then on a comparison for equality so that the precise force is known. The desired movement is also dictated by a computational loop discussed below. Communication of PID calculation module 64 proceeds to digital-to-analogue converter 66 which sends the analogue signal to servo amp 68 for driving motor 60. The loop x described from encoder 62 to motor 60 is dubbed the operational loop 70. Components of the operational loop are duplicated for each motor which in the preferred embodiment means that six loops are preferred.

Assisting in the provision of data to PID calculation module 64 is computational loop 72. Loop 72 receives input from three lines 74, 76, and 78 in digital format. Each of the lines has its own analogue-to-digital converter 80 (only one shown). Analogue-to-digital converter 80 receives information for the deflection-sensing subsystem of the invention, one sensor of which is illustrated here at 82. Preferably three sensors are provided, one for each line (74, 76 and 78). The digital input of, for example, line 74 is received in computation module 84 where z, α and β, are calculated, tilt being equal or not to zero and θ being equal or not to zero. This information is also affected by the input of orbit parameters 86 which are preprogrammed. It is additionally affected by the calculated x and y coordinates module 88 for the next expected orbit. The calculation of x and y in module 88 is also provided with the PID calculation module 64 information from the previous command. Subsequent to each of the calculations noted, the calculated information is conveyed to converter 90 which converts desired x, y, z, α, β and θ to motor positions A,B,C,D,E,and F. This information is provided to PID 64 and the process continues. All of these functions and directions are effected, as stated above, approximately 2000 times per second.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A tactile feedback system comprising:
    a workpiece or work tool moving platform having multiple degrees of freedom;
    a plurality of arms articulated with platform to control position of platform;
    a flexure attached to said moving platform said flexure having multiple degrees of freedom;
    a sensor subsystem to sense movement of said flexure; and
    a controller connected to said sensor subsystem and to said plurality of arms.

2. A tactile feedback system as claimed in claim 1 wherein said platform has at least five degrees of freedom.

3. A tactile feedback system as claimed in claim 1 wherein said flexure has three degrees of freedom.

4. A tactile feedback system as claimed in claim 1 wherein said plurality of arms each is connected to a driver.

5. A tactile feedback system as claimed in claim 4 wherein each said driver is controlled by said controller.

6. A tactile feedback system as claimed in claim 1 wherein each said sensor subsystem is a Hall effect system.

7. A tactile feedback system as claimed in claim 6 wherein three Hall effect sensors are positioned about 120° degrees apart from one another on said platform.

8. A tactile feedback system comprising:
    a moving platform;
    a plurality of arms articulated with said platform and being driveable by individual drivers;
    a sensor subsystem connected to said platform to determine forces thereon; and
    a controller connected to said sensor subsystem and to said individual drivers.

9. A tactile feedback system as claimed in claim 8 wherein said plurality of arms is six arms.

10. A tactile feedback system as claimed in claim 8 wherein said moving platform has six degrees of freedom.

11. A tactile feedback system as claimed in claim 8 wherein said sensor subsystem employs a plurality of Hall effect sensors.

12. A tactile feedback system for a lens machine comprising:
    a flexure having an outer ring and an inner ring, said inner ring having three degrees of freedom relative to said outer ring;
    a deflection-sensing subsystem having:
    a plurality of magnets mounted to said inner ring of said flexure;
    a Hall effect sensor circuit board in magnetic-field-sensing relation to said plurality of magnets;

a second plurality of magnets in magnetic-field-sensing relation to said Hall effect sensor circuit board; and whereby deflection of said inner ring of said flexure relative to said outer ring of said flexure is sensed by said Hall effect sensor circuit board due to movement of one or more of plurality of magnets.

13. A tactile feedback system as claimed in claim 12 wherein said inner ring and said outer ring are interconnected by a series of dog leg members.

14. A tactile feedback system as claimed in claim 13 wherein said members number nine and are equidistantly circumferentially arranged.

15. A tactile feedback system as claimed in claim 12 wherein said Hall effect sensor circuit board is mounted to a stop ring and a ring to which said second plurality of magnets is mounted.

16. A tactile feedback system as claimed in claim 12 wherein said plurality of magnets is three magnets.

17. A tactile feedback system as claimed in claim 12 wherein said second plurality of magnets is equal in number to said plurality of magnets.

18. A tactile feedback system as claimed in claim 12 wherein said Hall effect sensor circuit board is connected to a controller.

19. A lens-preparing machine as claimed in claim 16 wherein said first plurality of magnets is three magnets.

20. A lens-preparing machine as claimed in claim 12 wherein said deflection-sensing subsystem is connected to a controller which is also connected to said plurality of drives.

21. A flexure for a lens machine comprising:

an outer ring;

an inner ring; and a plurality of members connecting said inner ring to said outer ring whereby a disk is created wherein said inner ring is moveable in three degrees of freedom relative to said outer ring.

22. A flexure as claimed in claim 21 wherein said flexure comprises phosphor bronze.

23. A flexure as claimed in claim 21 wherein said flexure is about 0.015 to 0.050 inch in thickness and is of a diameter of about 5.5 inches.

24. A flexure as claimed in claim 21 wherein said plurality of members are dog-leg shaped members.

25. A lens-preparing machine comprising:

a frame;

a plurality of drives mounted to said frame;

a plurality of connectors articulatingly linking said plurality of drives to a lens moving platform;

a flexure mounted to said moving platform; and a deflection-sensing subsystem mounted in communication with said flexure.

26. A lens-preparing machine as claimed in claim 25 wherein said flexure includes an inner ring and an outer ring, said inner ring having three degrees of freedom relative to said outer ring.

27. A lens-preparing machine as claimed in claim 26 wherein said inner ring and said outer ring are interconnected by a series of dog leg members.

28. A lens-preparing machine as claimed in claim 27 wherein said members number nine are equidistantly circumferentially arranged.

29. A lens-preparing machine as claimed in claim 25 wherein said deflection sensing subsystem comprises:

a plurality of magnets mounted to said inner ring of said flexure;

a Hall effect sensor circuit board in magnetic field sensing relation to said plurality of magnets; and a second plurality of magnets in magnetic field sensing relation to said Hall effect sensor circuit board.

30. A tactile feedback system for a lens machine comprising:

a moving platform;

a lap or lens blank mounted to said platform said lap or lens blank having more than two degrees of freedom relative to said platform;

a sensor subsystem to sense force of said lap or lens blank; and a controller connected to said sensor subsystem and having control over motion of said moving platform.

* * * * *